(12) United States Patent
Genefke

(10) Patent No.: US 9,844,883 B2
(45) Date of Patent: Dec. 19, 2017

(54) GRIPPER

(71) Applicant: Yaskawa Nordic AB, Torsås (SE)

(72) Inventor: Bo Genefke, Vejle (DK)

(73) Assignee: YASKAWA NORDIC AB (SE)

( * ) Notice: Subject to any disclaimer, the term of this patent is extended or adjusted under 35 U.S.C. 154(b) by 0 days.

(21) Appl. No.: 15/129,600

(22) PCT Filed: Mar. 19, 2015

(86) PCT No.: PCT/SE2015/050318
§ 371 (c)(1),
(2) Date: Sep. 27, 2016

(87) PCT Pub. No.: WO2015/147724
PCT Pub. Date: Oct. 1, 2015

(65) Prior Publication Data
US 2017/0173800 A1   Jun. 22, 2017

(30) Foreign Application Priority Data

Mar. 28, 2014 (SE) ...................... 1450358

(51) Int. Cl.
*B25J 15/00* (2006.01)
*B65H 3/32* (2006.01)

(52) U.S. Cl.
CPC ....... *B25J 15/0014* (2013.01); *B25J 15/0019* (2013.01); *B65H 3/32* (2013.01)

(58) Field of Classification Search
CPC ................ B25J 15/0014; B25J 15/0019; B25J 15/0033; B25J 15/0071; B25J 15/08; B65H 3/32; B65H 3/50; B65H 5/14; B65H 2301/4224; B65H 2301/42242
USPC .... 294/213, 64.3, 104, 902; 414/796, 796.2, 414/796.5, 796.9
See application file for complete search history.

(56) References Cited

U.S. PATENT DOCUMENTS 3,355,074 A   11/1967   Brewin et al.
5,102,292 A *  4/1992   Brinker ................. B65G 61/00
                                                   414/796

(Continued)

FOREIGN PATENT DOCUMENTS

CA     2 745 476   *  1/2013
DE     2649959 A1    5/1978

(Continued)

*Primary Examiner* — Dean Kramer
(74) *Attorney, Agent, or Firm* — Condo Roccia Koptiw LLP

(57) ABSTRACT

The invention concerns a gripper (1) adapted to be used in an automated system for handling flexible substrates provided in a pile. The gripper (1) is rotatably arranged on an arm (6) of a robot and comprises a lower finger (7) and an upper finger (8). The lower finger (7) comprises a sharp, wedge-shaped edge (14), which is adapted to enable insertion of the lower finger (7) between substrates of the pile. The lower finger (7) has a round tip (11), which extends to at least one side of the lower finger (7) and forms a smooth, wedge-shaped edge (15), wherein the sharp, wedge-shaped edge (14) is arranged on the at least one side remote from the round tip (11) and substantially in level with but protruding further than the smooth, wedge-shaped edge (15).

16 Claims, 2 Drawing Sheets

(56) References Cited

U.S. PATENT DOCUMENTS

| | | | | |
|---|---|---|---|---|
| 5,380,147 A | * | 1/1995 | Hess | B65G 61/00 |
| | | | | 414/796 |
| 6,139,253 A | * | 10/2000 | Battrel | B01D 25/26 |
| | | | | 294/115 |
| 2009/0108520 A1 | * | 4/2009 | Stemmer | B65H 3/48 |
| | | | | 271/264 |
| 2013/0223968 A1 | | 8/2013 | Fleckenstein et al. | |

FOREIGN PATENT DOCUMENTS

| DE | 2723162 A1 | 11/1978 |
|---|---|---|
| DE | 19927946 A1 | 1/2001 |
| WO | WO 2012/069056 A1 | 5/2012 |

\* cited by examiner

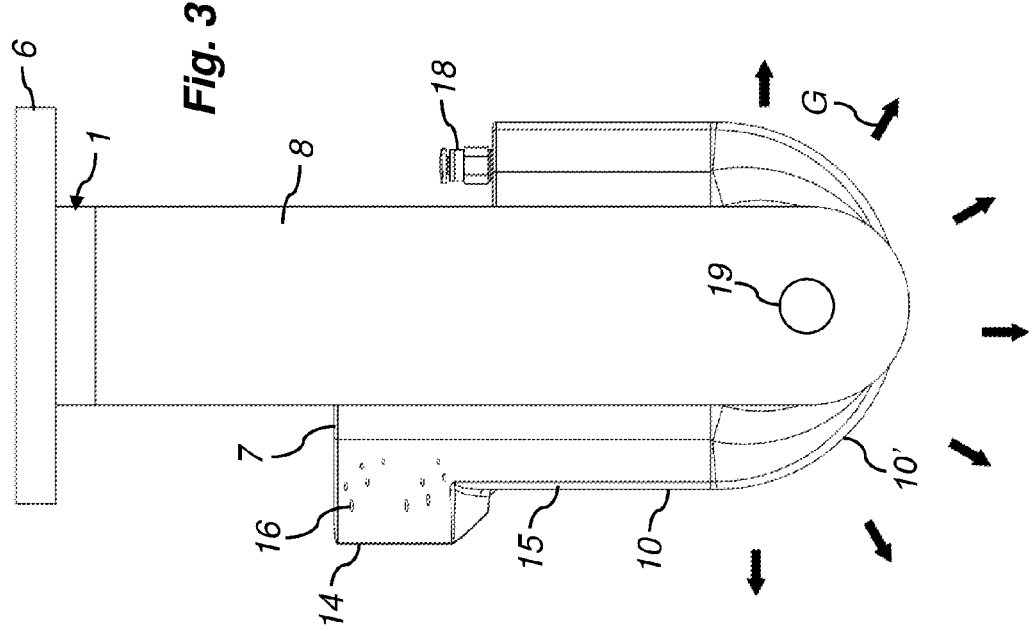
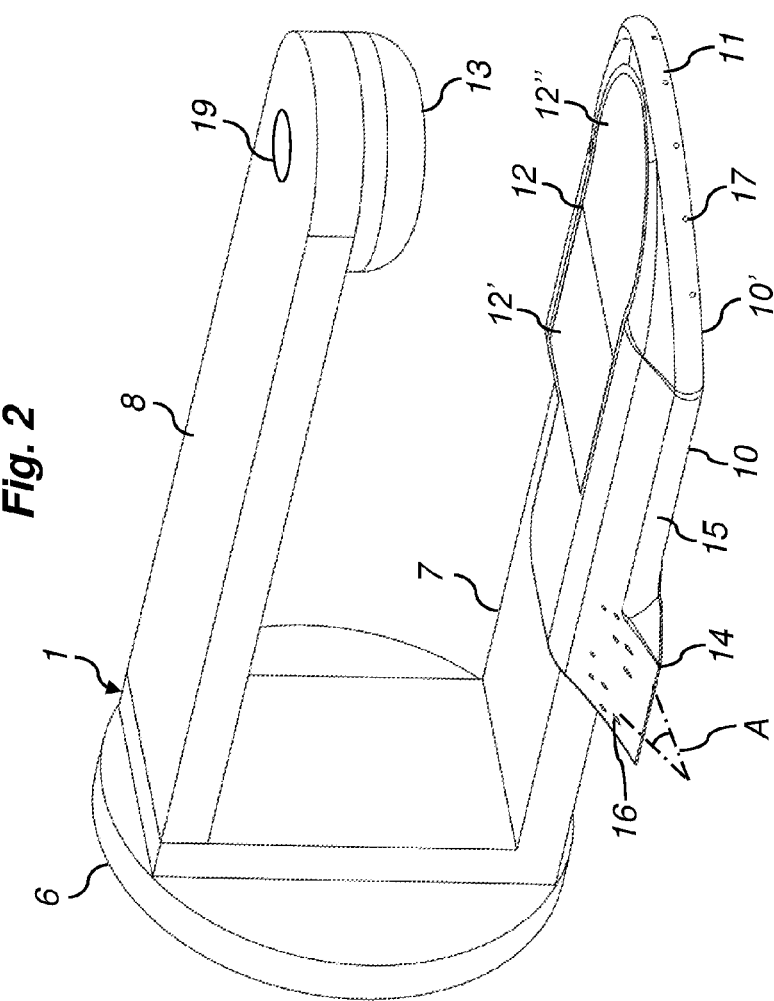

GRIPPER

CROSS REFERENCE TO RELATED APPLICATIONS

This application is the National Stage Entry under 35 U.S.C. §371 of Patent Cooperation Treaty Application No. PCT/SE2015/050318, filed Mar. 19, 2015, which claims priority from Sweden Application No. 1450358-5, filed Mar. 28, 2014, the contents of which are hereby incorporated by reference herein.

TECHNICAL FIELD

The present invention relates to a gripper adapted to be used in an automated system for handling flexible substrates provided in a pile, said gripper being rotatably arranged on an arm of a robot and comprising a lower finger and an upper finger, wherein said lower finger comprises a sharp, wedge-shaped edge, which is adapted to enable insertion of said lower finger between substrates of said pile.

In this context, flexible substrates is meant to comprise all sorts of flexible substrates which can be provided in piles, that is for instance paper sheets, whether printed or not, plastic substrates, sheets of metal foil, or even sheets of pastry or pasta. Further, by handling in this context is meant gripping and lifting of at least one flexible substrate at a time off of a pile, for instance in order to relocate it, to turn it or to aerate it.

PRIOR ART

A gripper according to the preamble is known from WO 2012/069056 A1, in which a device is disclosed for automatic handling and aeration of a pile of substrates in the form of paper sheets. The gripper of the device in question is one of a pair of grippers being rotatably arranged on one arm each of a two-arm robot.

In order to enable insertion of a lower finger between paper substrates of a pile said lower finger comprises a tip portion having a straight front edge with a chisel shaped grind, the bevel of which being placed on the bottom side of the finger.

OBJECT OF THE INVENTION

The shape of the lower finger of the prior art gripper is prone to cause wrinkling of substrates or scratching of these, especially when a lower finger, inserted between flexible substrates of a pile, is moved sideways along the pile.

Against that background an object of the present invention is to mitigate the wrinkling or scratching problem by providing an improved gripper.

BRIEF SUMMARY OF THE INVENTION

According to the invention the above object is achieved by means of a gripper according to the preamble, said gripper being characterized in that said lower finger has a round tip, which extends to at least one side of the lower finger and forms a smooth, wedge-shaped edge, and in that said sharp, wedge-shaped edge is arranged on said at least one side remote from said tip and substantially in level with but protruding further than said smooth, wedge-shaped edge. By this arrangement it is rendered possible for the robot, when holding the gripper in a first rotational position, to first let the sharp edge enter between substrates of the pile and then let the smooth edge follow into a gap created by the sharp edge. And further, when the robot thereafter is turning the gripper into a second rotational position, to move the sharp edge out of the pile and to just let the smooth edge remain therein, said smooth edge being less prone to cause damage to the flexible substrates than a sharp edge is when for instance moving an inserted gripper along said pile.

Preferably, said wedge-shaped edges rise from a substantially flat bottom face of said lower finger towards a flat top plateau of that finger. This is of great benefit for one thing because the sharp edge, while it is being inserted in a pile, in that way smoothly lifts substrates above without affecting substrates below, and for another because the slant of the smooth edge to some extent makes the shape of the lower finger fit a natural shape adopted by flexible substrates when an inserted lower finger is moved sideways along a pile.

Movement of an inserted lower finger along a pile is further optimized, if said bottom side and said top plateau are exactly or at least substantially parallel.

Movement of an inserted lower finger along a pile is still further optimized, if a tip part of said bottom face is tapering towards said top plateau.

Preferably, a plurality of first gas nozzles is arranged in an interface area between said sharp, wedge-shaped edge and said top plateau, said first gas nozzles being directed to blow gas essentially in parallel with and away from the top plateau. This is advantageous since it cushions movement of the sharp edge while being inserted into a pile.

Preferably, a plurality of second gas nozzles is arranged along said smooth, wedge-shaped edge, said second gas nozzles being directed to blow gas essentially away from said rounded tip in parallel with the top plateau. This is of great help when moving an inserted lower finger along a pile and for safe release of previously gripped substrates from a gripper.

Preferably, the gas used is ionized air. Ionized air causes less problems with static electricity, which is of great advantage in the case at hand.

Preferably, said smooth, wedge-shaped edge extends around said tip to both sides of said lower finger. Such a solution is advantageous since it renders it possible to displace an inserted lower finger equally well to both sides along a pile and since it allows use of a pair of identical grippers, each rotatably arranged on an arm of a two armed robot. Use of identical grippers simplifies logistics and servicing, a prerequisite for that being that the grippers are equally well usable on both arms of the robot.

Test made by the applicant have shown that the best result, that is the smoothest substrate handling, is achieved if said sharp, wedge-shaped edge forms an edge angle within an interval of 5-30°, preferably of 10-25°, and most preferably of 15-20°.

Preferably, said smooth, wedge-shaped edge is recessed in relation to the sharp edge, but rises to the top plateau at the same angle as the sharp edge and coplanar with that edge. In that way a smooth transition between the two edges is achieved.

For increased durability said top plateau preferably comprises a metal inlay.

The upper finger preferably comprises a resilient pad, which is arranged opposite to said lower finger rotatably about an axis normal to said upper finger. This is advantageous since flexible substrates require careful handling and the lower finger has to be made quite rigid in order to fulfill its task of insertion between and rotation in relation to said substrates.

Preferably, the resilient pad is provided with an air bleed duct. This is of help when releasing of previously gripped substrates from a gripper, since it prevents suction forces.

Preferably, the top plateau of the lower finger comprises a resilient inlay opposite to the resilient pad of the upper finger. This is advantageous since it reduces impact on the flexible substrates and helps providing enough friction to enable safe handling of substrates even at moderate gripping pressure levels.

BRIEF DESCRIPTION OF THE DRAWINGS

In the drawings an embodiment of the present invention is illustrated schematically, wherein:

FIG. 2 is a perspective view showing a gripper of the robot; and

FIG. 3 is a top view showing the gripper of FIG. 2.

DETAILED DESCRIPTION OF A PREFERRED EMBODIMENT

Figure 1:
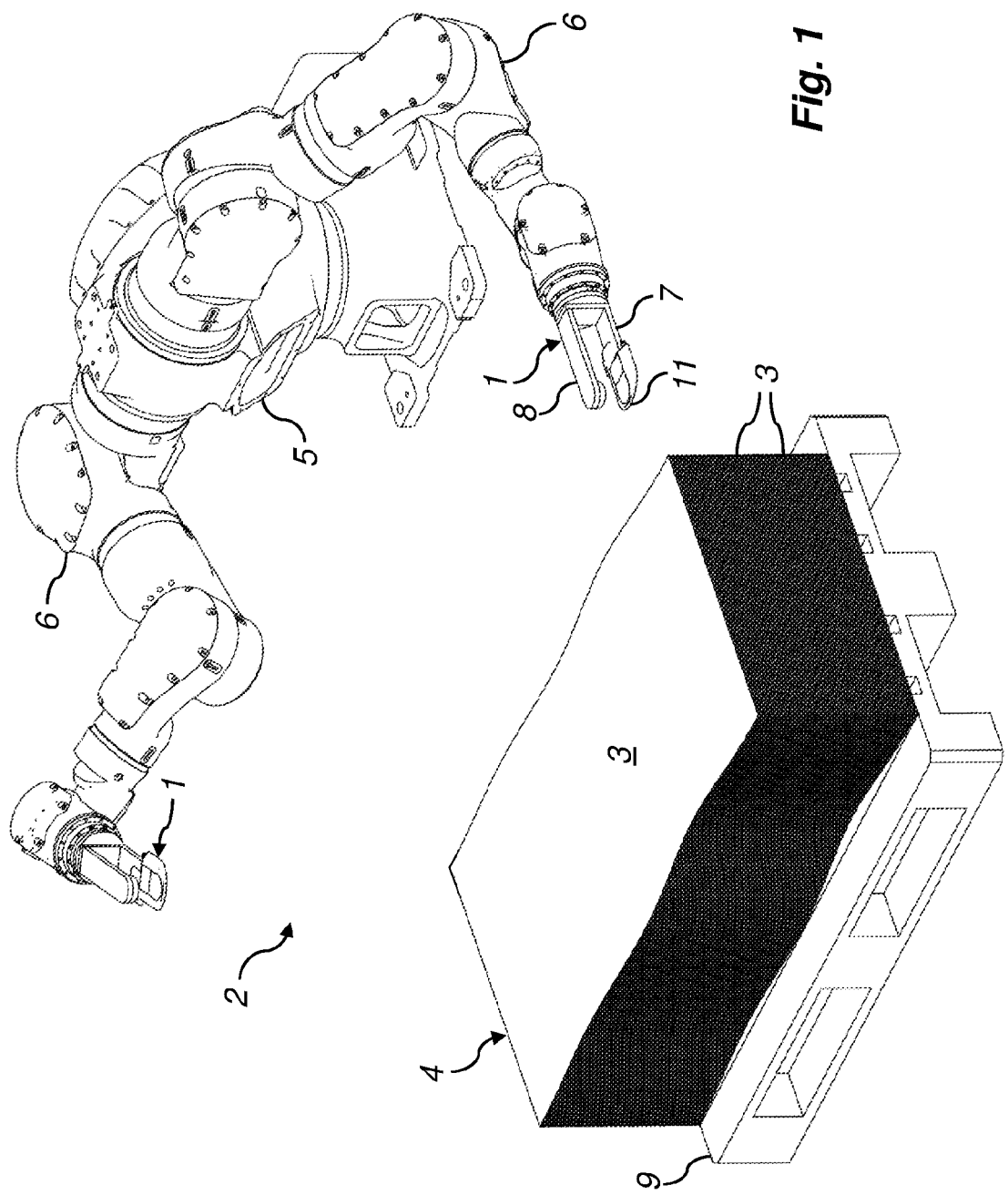
FIG. 1 is a perspective view showing a two armed robot behind a pile of flexible substrates.

In the following a preferred embodiment of the invention is described in detail with reference being had to the accompanying drawings.

The invention concerns a gripper 1, which is adapted to be used in an automated system 2 for handling flexible substrates 3 provided in a pile 4.

As can be seen in FIG. 1, according to the preferred embodiment of the invention the system 2 comprises a two-arm robot 5, which is placed behind said pile 4. The robot 5 comprises two arms 6 being bendable or rotatable about a plurality of axis, which is well known in the art and hence not further elucidated. The robot 5 further comprises a pair of grippers 1, which can be identical, mirror-inverted or all different and are rotatably arranged on one arm 6 each of the robot 5. In the following the description is limited to just one of the grippers 1, which is one that bears the features of the present invention and is illustrated in detail in the drawings in FIGS. 2 and 3.

The gripper 1 shown in FIG. 2 comprises a lower finger 7 and an upper finger 8, wherein lower and upper in this case refer to normal use of the gripper 1 when dealing with a substantially flat pile 4, which is horizontally resting on a floor or another leveled base 9 (c.f. FIG. 1).

The lower finger 7 comprises a flat bottom face 10, which for a tilting action described below is rising somewhat at 10' towards a fingertip 11, and a flat top plateau 12, which is parallel with the bottom face 10. The bottom face 10 and the top plateau 12 both have a basically rectangular shape but converge into a semi-circular shape towards the fingertip 11. The bottom face 10 and the top plateau 12 are interconnected by means of wedge structure (to be described in detail below) on all sides except where they meet the arm 6 of the robot 5. Since the top plateau 12 is smaller than the bottom face 10, the wedge structure is slanting from the top plateau 12 towards the bottom face 10 and meets the bottom face 10 along straight lines on sides of the lower finger 7 (mind said basically rectangular shape) and along a curved line along the fingertip 11 (mind said semi-circular shape).

The upper finger 8 is arranged opposite to the lower finger 7 and movable towards and away from the lower finger 7 by parallel displacement under control of the robot 6. The upper finger 8 comprises an essentially dome shaped resilient pad 13, which is arranged exactly opposite to the top plateau 12 of the lower finger 7 and for added flexibility and smooth substrate handling is rotatable about an axis normal to said upper finger 8.

The lower finger 7 is arranged to be inserted between substrates 3 of the pile 4 by wedging the substrates 3 apart. This is accomplished by means of a first portion of said wedge structure, which comprises a sharp, wedge-shaped edge 14 arranged on one side of the lower finger remote from the fingertip 11. As can be seen, the sharp edge 14 rises from the bottom face 10 of the lower finger 7 towards the top plateau 12 at an acute angle A, which preferably lies within an interval of 5-30°, preferably of 10-25°, and most preferably of 15-20°.

As the sharp edge 14 is arranged on a side of the lower finger 7, in order to make it wedge substrates 3 apart the gripper 1 has to be turned by the robot 5, such that the lower finger 7 approaches the pile 4 sideways.

Once the initial wedging has taken place according to the above, a second portion of the wedge structure comes into play. The second portion of the wedge structure comprises a smooth, wedge-shaped edge 15, which extends along both said sides of the lower finger 7 and runs around the fingertip 11. As can be seen, the smooth edge 15 is recessed in relation to the sharp edge 14, but rises to the top plateau 12 at the same angle A as the sharp edge 14 and coplanar with that edge 14. Thus, after the initial wedging being performed by the sharp edge 14, the smooth edge 15 can without difficulty enter between the substrates 3, too. Now it is possible to turn the gripper 1 in a way that leaves just the smooth edged portion 15 of said wedge structure between the wedged apart substrates 3, the fingertip 11 pointing straight forward into the pile 4.

When the lower finger 7 is inserted in the way just described, the resilient pad 13 of the upper finger 8 is arranged above a top substrate 3 of the pile 4, however not yet tightened. Hence, the lower finger 7 can be displaced sideways along the pile 4 helped by the wedging effect of the smooth edge 15 on the sides and tip 11 of the lower finger 7.

In order to prevent the lower finger 7, while being displaced sideways, from scratching or in another way harming a substrate 3 resting thereon, preferably the gripper 1 is tilted, such that only an edge of said substrate 3 contacts the top plateau 12 of the lower finger 7 in an inner area remote from the finger tip and such that portion 10' of the flat bottom face 10 of the lower finger 7 lies in a substantially horizontal plane.

Although being flexible, substrates 3 with time tend to wear the inner area of the top plateau 12 down because of the sideways displacement. Hence, according to a preferred embodiment in said inner area the top plateau 12 comprises a wear resistant metal inlay 12' in level with the plateau 12 as such (c.f. FIG. 2).

When the desired position along the pile 4 is reached, if tilted before, the gripper 1 is leveled again. Then the upper finger 8 with its resilient pad 13 is lowered onto said top substrate 3, thus gripping at least one substrate 3 for subsequent handling between the resilient pad 13 of the upper finger 8 and a corresponding resilient inlay 12" of the flat top plateau 12 of the lower finger 7. The resilient inlay 12", which is in level with the top plateau 12 as such, and the smooth edge 15 slanting from the top plateau 12 help treating substrates 3 carefully, wherein the resilient inlay 12" and the resilient pad 13 together are able to provide enough friction to enable safe handling even at moderate gripping pressure levels.

Despite the above, when handling flexible substrates 3 there is always a risk that these in some way become entangled with a gripper 1, for instance due to static electricity. The effects of such an entanglement can be that substrates 3 are wrinkled during displacement sideways of a gripper 1 along a pile 4 or that they are not properly released at the finish of a handling operation.

In order to mitigate the risk of such entanglement, according to the preferred embodiment of the gripper 1 according to the invention a plurality of first gas nozzles 16 is arranged at the sharp edge 14 in an interface area between the edge 14 and the top plateau 12. These first gas nozzles 16 serve to direct a flow of gas essentially in parallel with and away from the top plateau 12, said gas cushioning contact between the substrates 3 and the sharp edge 14.

Out of the same reason, although for cushioning contact between the substrates 3 and the smooth edge 15, a plurality of second gas nozzles 17 is arranged along at the smooth edge 15 along the fingertip 11. The second gas nozzles 17 are directed to blow gas (c.f. arrows G in FIG. 3) essentially in parallel with and away from the top plateau 12.

A single gas feed 18 suffices to provide gas to both types of nozzles 16, 17, and it has turned out that ionized air is an excellent choice of gas as it helps further mitigating problems arising due to static electricity. Further, there is obviously no need of blowing gas other than when the gripper 1 is moved in relation to or is releasing at least one substrate 3, wherein such releasing can be further facilitated if the resilient pad 13 of the upper finger 8 is provided with an air bleed duct 19 to safely avoid suction effects.

The person skilled in the art is aware that the preferred embodiment described above can be varied in different ways within the scope of the appendent claims. Hence, for instance the shape of the gripper 1 could be altered into a rectilinear instead of the curved one, and the edges 14, 15, which are shown to be rising from a large bottom face 10 to a small top plateau 12, could instead be undercut if use is made of a small bottom 10 face and a large top plateau 12. Further, the resilient inlay 12" of the top plateau 12 can be made rotatable instead of or complementary to the rotatability of the resilient pad 13.

The invention claimed is:

1. A gripper adapted to be used in an automated system for handling flexible substrates provided in a pile, said gripper being rotatably arranged on an arm of a robot and comprising a lower finger and an upper finger, wherein said lower finger comprises a sharp, wedge-shaped edge configured to enable insertion of said lower finger between the flexible substrates of said pile, wherein said lower finger comprises a round tip that extends to at least one side of the lower finger and forms a smooth, wedge-shaped edge, and wherein said sharp, wedge-shaped edge is arranged on said at least one side remote from said tip and is substantially in level with but protruding further than said smooth, wedge-shaped edge.

2. The gripper according to claim 1, wherein said wedge-shaped edges rise from a substantially flat bottom face of said lower finger towards a flat top plateau of that finger.

3. The gripper according to claim 2, wherein said flat bottom face and said flat top plateau are parallel.

4. The gripper according to claim 3, wherein a tip part of said flat bottom face tapers toward said flat top plateau.

5. The gripper according to claim 2, wherein a plurality of first gas nozzles are arranged in an interface area between said sharp, wedge-shaped edge and said flat top plateau, said first gas nozzles being directed to blow gas substantially in parallel with and away from the flat top plateau.

6. The gripper according to claim 5, wherein a plurality of second gas nozzles is arranged along said smooth, wedge-shaped edge, said second gas nozzles being directed to blow gas substantially away from said rounded tip in parallel with the flat top plateau.

7. The gripper according to claim 5, wherein said gas is ionized air.

8. The gripper according to claim 2, wherein said sharp, wedge-shaped edge forms an edge angle within an interval of 5-30 degrees.

9. The gripper according to claim 8, wherein said smooth, wedge-shaped edge is recessed in relation to the sharp, wedge-shaped edge, but rises to the flat top plateau at the same angle as the sharp, wedge-shaped edge and coplanar with the sharp, wedge-shaped edge.

10. The gripper according to claim 2, wherein said flat top plateau comprises a metal inlay.

11. The gripper according to claim 2, wherein said upper finger comprises a resilient pad arranged opposite to said lower finger, wherein said resilient pad is configured to rotate about an axis normal to said upper finger.

12. The gripper according to claim 11, wherein said resilient pad comprises an air bleed duct.

13. The gripper according to claim 11, wherein said flat top plateau comprises a resilient inlay opposite to the resilient pad of the upper finger.

14. The gripper according to claim 1, wherein said smooth, wedge-shaped edge extends around said tip to both sides of said lower finger.

15. The gripper according to claim 1, wherein said sharp, wedge-shaped edge forms an edge angle within an interval of 10-25 degrees.

16. The gripper according to claim 1, wherein said sharp, wedge-shaped edge forms an edge angle within an interval of 15-20 degrees.

* * * * *